United States Patent

[11] 3,602,040

[72] Inventor Charles E. Shulze
 Glastonbury, Conn.
[21] Appl. No. 882,978
[22] Filed Dec. 8, 1969
[45] Patented Aug. 31, 1971
[73] Assignee United Aircraft Corporation
 East Hartford, Conn.

[54] HIGH SPEED FILAMENT TENSILE TESTER
 4 Claims, 3 Drawing Figs.
[52] U.S. Cl. .................................................. 73/95.5
[51] Int. Cl. .................................................. G01n 3/02
[50] Field of Search ........................................... 73/95.5, 95

[56] References Cited
UNITED STATES PATENTS
3,140,601 7/1964 Weyland et al. ............... 73/95 X
3,218,847 11/1965 Starer et al. ................... 73/95

Primary Examiner—Jerry W. Myracle
Attorney—John D. Del Ponti

ABSTRACT: A filament tensile testing apparatus comprising first and second flexural supports each having a free end, aligned gripping means mounted on the free end of each support for gripping a specimen filament, the supports being deflectable to displace the gripping means while maintaining coaxiality therebetween, means for applying a deflecting force to the first support and means for measuring the deflection of the second support when the filament is gripped by the gripping means and a deflecting force is applied to the first support.

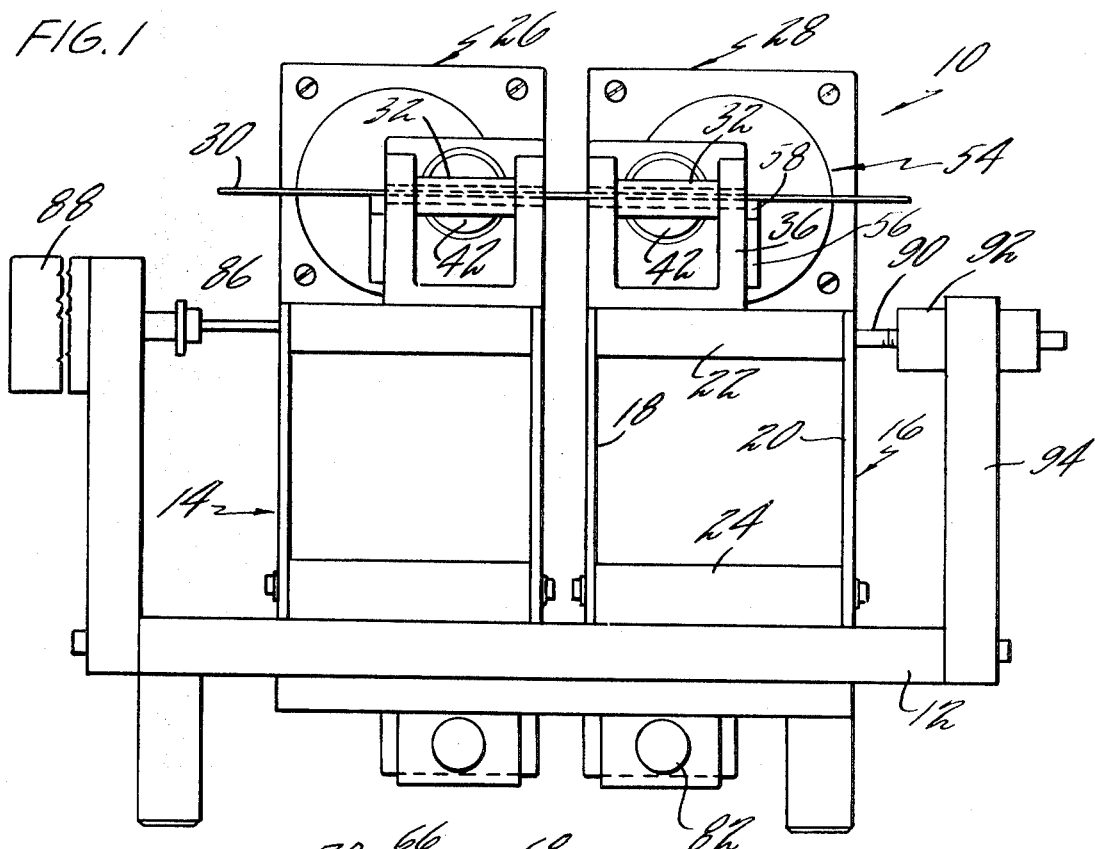
FIG.1
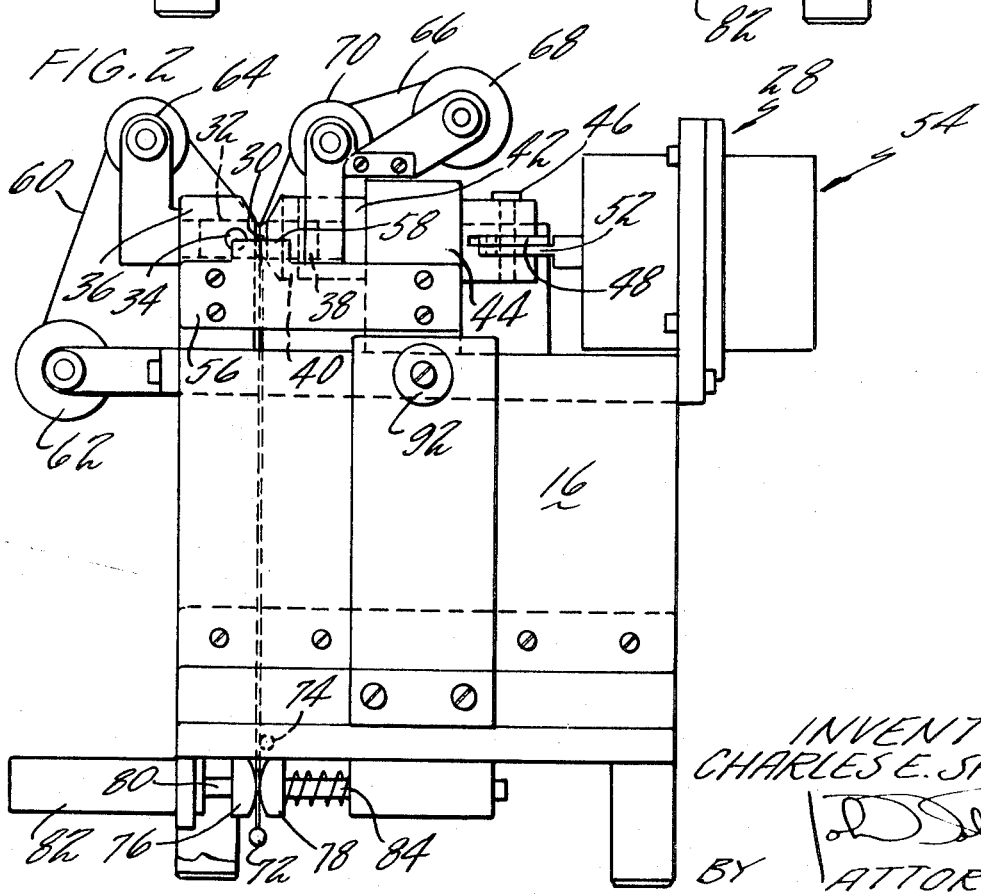
FIG.2
INVENTOR
CHARLES E. SHULZE
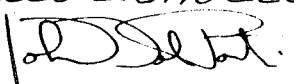
BY ATTORNEY 3,602,040

HIGH SPEED FILAMENT TENSILE TESTER

BACKGROUND OF THE INVENTION

This invention relates generally to tensile testing apparatus and more particularly relates to improved apparatus capable of rapidly and accurately determining the ultimate tensile strength of filamentary material.

In recent years there have emerged a number of high strength, high modulus filaments such as boron which have found wide application in the aerospace industry. A major criterion for assessing the quality of such filament resides in its ultimate tensile strength. Not only must the tensile strength be measured accurately, but in a large production facility, for cost effectiveness, the tensile tests must also be run rapidly. Typical testing requirements dictate that many thousands of tests be run each day.

Prior art techniques for tensile testing boron filament have been found to be costly and on the whole unsatisfactorily slow; known techniques which were employed have been typically limited to a maximum of approximately 200 individual tests per day.

SUMMARY OF THE INVENTION

The present invention contemplates the provision of means for tensile testing filamentary material rapidly and accurately and includes filament gripper pairs mounted on separate flexural supports which are deflected to displace the gripper pairs while simultaneously essentially maintaining coaxiality therebetween so that the filamentary material receives only an axial load. It further contemplates the usage of one of the flexural supports as a load cell to provide frictionless linear motion, precision alignment and exactly repeatable gauge-length control.

The invention incorporates a method for automatically providing a fresh surface of foil lining for each test in order to cushion and hold the specimen filament between aligned anvils and further incorporates a method of carefully gripping the ends of the filament under a controllable pressure. The present technique is adaptable to a wide variety of filaments and has resulted, in the case of boron filaments, in a cost savings of 80 to 90 percent over other known methods, with the ability to perform approximately 5000 tests in an 8-hour span.

BRIEF DESCRIPTION OF THE DRAWINGS

An understanding of the invention will become more apparent to those skilled in the art by reference to the following detailed description when viewed in light of the accompanying drawings, wherein:

FIG. 1 is a front elevational view of the tensile testing apparatus;

FIG. 2 is a side elevational view of the same; and

DESCRIPTION OF THE PREFERRED EMBODIMENTS

Figure 3:
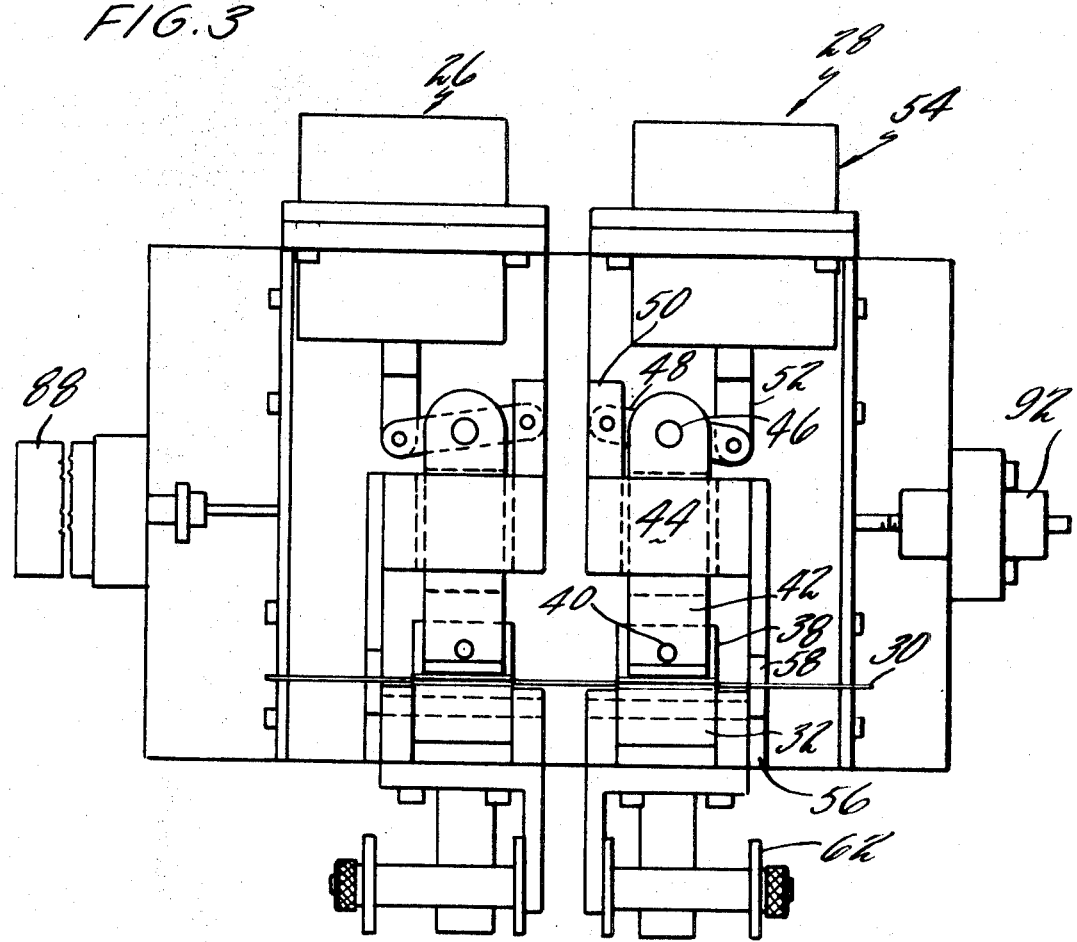
FIG. 3 is a plan view thereof.

Referring now to the drawings, wherein like numerals indicate like parts, an improved filament tensile testing apparatus is generally identified by the numeral 10. The apparatus is suitably supported on a base 12 which may conveniently be secured to a table or bench or the like. A pair of boxlike supports 14 and 16, secured at their lower end to the base 12, project vertically upwardly therefrom. From simplicity in discussion and as the supports are identical, only the supports 16 will be described in detail. The support 16 comprises a pair of flexures or parallel vertical plates 18 and 20 secured together at their upper and lower ends by horizontal plates 22 and 24 respectively. The flexures 18 and 20 are formed to a dimension and of a material to provide suitable transverse flexibility in response to an applied load as dictated by accepted criteria for flexure design. In practice, hardened steel plate is preferred, with the maximum stress in each flexing member being limited to 50,000 p.s.i., although Ni-span C or beryllium-copper alloys are also suitable.

Mounted on the upper free end of each support 14 and 16 are clamping assemblies 26 and 28 which function as power grips to clamp under force separate portions of a filament 30. Again, as the clamping assemblies are identical save for their symmetrical placement, only the assembly 28 will be discussed in detail. As best seen in FIG. 2, a relatively fixed grip or anvil 32 is pivotally mounted, by horizontal pin 34, in a U-shaped support 36 which is itself rigidly secured to the horizontal plate 22. The anvil 32 is basically a rectangular parallelepiped insert, preferably made of steel, hardened to RC 40 minimum having a mirror-smooth working face with all edges around. A movable grip or anvil 38, of the same material as anvil 32, is directly opposed to the anvil 32, and is pivotally mounted by a vertical pin 40 in the free end of a reciprocable rod 42. The rod 42 is slidably received in a pillow block 44 mounted on the plate 22 and is pivotally connected by pin 46 to a medial portion of a linkage 48. The linkage is itself pivotally secured at one end to pillow block extension 50 and at its other end to the piston rod 52 of a suitable piston assembly 54, preferably pneumatic, for controlled reciprocation of the rod 42 and anvil 38. It will be appreciated by those skilled in the art that with the opposed anvils 32 and 38 pivotable about axes perpendicular to one another, the working faces thereof will self-adjust to make proper contact on the wire 30.

In order to permit rapid closing of the anvil 38 and thus increase efficiency, particularly when working with filaments such as high modulus boron which are prone to shatter when impacted at pressure, the air piston assembly is suitably controlled so that the anvil 38 is closed at extremely low pressure below 2 p.s.i. and then, at approximately the instant contact is made, the full pressure force is applied. Of course, the maximum anvil pressure will be determined, at least in part, by that minimum amount of pressure necessary to keep the filament 30 from slipping when tensed. In practice, an anvil pressure in the range of 100–150 pounds has been found suitable, with a force of 135 pounds being preferred. The details of the mechanism for applying load to the anvil 38 and for measuring that load have been omitted as it is considered well within the purview of those skilled in the art.

A guide plate 56, having an upper edge portion 58 at an elevation approximately equal to the horizontal central axis of the anvils, is secured at one end to the support 36 and at the other end to the bushing 44. As will be appreciated, with a guide plate 56 provided for each clamping assembly 26 and 28, initial positioning of the filament 30 is greatly facilitated as it is simply laid horizontally upon the edges 58.

It has been determined that testing accuracy is best served when the filament is cushioned from the working faces of the anvils. For this reason, a lining with aluminum or any other type of foil which will prevent crushing and slippage during testing is satisfactory. In the present invention, there is provided means for automatically furnishing, over the region in contact with the filament, a fresh surface of foil lining to each anvil working face for each separate test. As best seen in FIG. 2, aluminum foil 60 is supplied from a roll 62 and passes over guide roll 64 and thence downwardly past the working face of the fixed anvil 32. Similarly, a second aluminum foil 66 is supplied from a roller 68 to pass over a guide roll 70 and thence downwardly past the working face of the movable anvil 38. It will be noted that the guide rolls 64 and 70 are set back from the plane of their respective anvil working faces to cause the foils 60 and 66 to form a suitable angle with the said plane so as to be noninterferring with the placement of the wire 30 onto the guides 58 when the anvils are open. The free ends of the foils 60 and 66 are maintained together by a weighted clip 72 so as to hang vertically downwardly past a post 74 and between enlarged head portions 76 and 78 respectively of a piston 80 of an air cylinder assembly 82 and of a spring biased rod 84. The air cylinder assembly 82, when activated, causes the head 76 to extend outwardly to engage the foil against the head 78 and thus pull the foils 60 and 66 past the post 74 a predetermined amount. The air cylinder assembly is controlled so as to be activated as soon as the closed anvils are opened.

Referring now to FIG. 1, it will be seen that the upper end of the flexural support 14 is secured, by means of a wire or cable 86 to an hydraulic cylinder 88. Other suitable linear-motion devices may be used for load application, as for example a cable and drum or a nut and motor driven screw. In any event, the wire 86 is used to pull the top plate 22 of the support 14 so that the fitment 30 gripped by clamping assemblies 26 and 28 is broken. It is to be understood the extent of pull is preferably limited in amount and is terminated by a suitable means such as a pneumatic or electric limit device or an electronic peak reading mechanism. As the pull of wire 86 is exerted upon the upper end of support 14, the flexural plates 18 and 20, being transverse to the direction of pull and being secured together by the plates 22 and 24, will deflect according to an "S" shape familiar to those skilled in the art. In other words, the upper plate 22 will be displaced relative to the lower plate 24 but will at all times remain horizontal.

In order to measure the filament breaking load to determine ultimate tensile strength, a rod 90 is secured to the upper end of the flexural support 16 and extends into a linear, variable, differential transformer (LVDT) 92 which is supported on the base 12 by a standard 94. The application of load to the flexural support 14 will be partially transmitted to the flexural support 16 via the filament 30 to cause the said support 16 to be deflected. In effect, the flexural support 16 acts as a load cell whose deflection in the horizontal direction is proportional to the applied load. The LVDT 92 measures the deflection and generates an output which is sent to an appropriate readout device. It is recognized that as one alternative to using an LVDT, strain gauges may be suitably mounted on the load cell flexures 18 and 20. Of course, it will be appreciated that the amount of deflection of the support 16 will be somewhat less than that of the support 14. However, the difference in elevation between their upper plates 22 is insignificant, being on the order of less than 50 microinches so that for practical purposes the anvil pairs are considered as being continually coaxial and the loading on the fiber 30 is considered as being axial only. Calibration of the apparatus is easily accomplished using the "dead weight" technique.

In operation, with the anvils 32, 38 of each clamping assembly 26, 28 initially in the open position, an operator places a specimen filament 30 on the guide edges 58 between the anvils and the foils 60 and 66, and activates the pneumatic piston assemblies 54 to clamp the filament 30. As soon as clamping pressure is applied to the filament 30 via the anvils 32, 38, the tensing load is applied by hydraulic cylinder 88 and the deflection of the load cell 16 is measured by the LVDT 92. When the filament breaks, the flexural supports restore to their original position, the anvils open and the foils are advanced by the air cylinder 82. In practice, the apparatus has been used for testing 4 mil boron filament with the capability of making 5,000 individual tests in an 8-hour day. Test values are fed automatically to a computer which outputs the pertinent data.

Type 1100 fully annealed aluminum foil, 1 inch wide and .003 inch thick has been found advantageous to line anvils having a working surface of 1 inch by one-fourth inch and positioned to provide a gauge length of 1 inch. In practice, flexures 3¼ inches high, by 5 inches long and 30 mils thick (having an effective flexure height of 2 inches) and made of precipitation hardened alloy 17–4PH were utilized. It should be noted that alignment of the filament 30 is critical and that such alignment is accomplished with great precision by the present invention. Vertical positioning of the filament is accomplished by the guide plates 56, which may be made adjustable. Horizontal positioning of the filament is accomplished by carefully aligning the working surfaces of the anvils 32 into a common plane.

The present invention is thus seen to advantageously provide a system of flexures upon which the gripping mechanism is mounted to ensure axial loading of the specimen with one set of the mounting flexures acting as a load cell and providing frictionless linear motion, precision alignment and exactly repeatable gauge-length control. The technique described allows for a careful gripping of the ends of a specimen filament under a controllable pressure which can be adjusted according to the type of filament and a means for automatically providing a fresh surface of foil lining to cushion and hold the filament between aligned anvils. The testing apparatus is extremely versatile, being adaptable to a wide variety of filaments and testing parameters through adjustable air pressures, loading rates, liner types and flexure thicknesses. At present, the present invention has resulted in a method of testing boron filaments at a cost which is only one-tenth to one-twentieth of that of other known methods.

What has been set forth above is intended primarily as exemplary to enable those skilled in the art in the practice of the invention and it should therefor be understood that, within the scope of the appended claims, the invention may be practiced in other ways than as specifically described.

What is claimed is:

1. Filament tensile testing apparatus comprising:
   a first support having a relatively fixed end and a relatively free end;
   a second support having a relatively fixed end and a relatively free end;
   said first and second supports each comprising a pair of upstanding flexural plates parallel to each other and perpendicular to the filament axis, said plates being rigidly spaced apart at their upper and lower ends;
   first gripping means mounted on the relatively free end of said first support for gripping a first portion of a filament;
   second gripping means, coaxial with said first gripping means, mounted on the relatively free end of said second support for gripping a second portion of the filament;
   said first and second support being deflectable to displace said first and second gripping means while maintaining coaxiality therebetween;
   means for applying a deflecting force to said first support; and
   means for measuring the deflection of said second support when said filament is gripped by said first and second gripping means and a deflecting force is applied to said first support.

2. The apparatus of claim 1 wherein said first and second gripping means each comprise first and second opposed anvils, at least one of said first and second anvils being movable toward and away from the other of said anvils.

3. The invention of claim 2 wherein said first anvil is pivotally mounted on an axis parallel to the filament axis and said second anvil is pivotally mounted on an axis perpendicular to the filament axis.

4. The invention of claim 3 including means for automatically providing a relatively soft foil surface to the working surface of each anvil when said first and second anvils move away from each other.